US007096268B1

(12) United States Patent
Shoda et al.

(10) Patent No.: US 7,096,268 B1
(45) Date of Patent: Aug. 22, 2006

(54) COPYRIGHTED DATA PROCESSING METHOD AND APPARATUS

(75) Inventors: Yukie Shoda, Moriguchi (JP);
Masayuki Kozuka, Arcadia, CA (US);
Katsumi Tokuda, Toluca Lake, CA (US); Noboru Hirata, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 775 days.

(21) Appl. No.: 09/652,147

(22) Filed: Aug. 31, 2000

(30) Foreign Application Priority Data

Sep. 1, 1999 (JP) ................................. 11-247924

(51) Int. Cl.
*G06F 15/16* (2006.01)

(52) U.S. Cl. ...................... 709/229; 709/225; 713/193; 713/201

(58) Field of Classification Search ............... 713/193, 713/201, 202; 709/225, 229; 705/51; 726/8
See application file for complete search history.

(56) References Cited

U.S. PATENT DOCUMENTS

| 5,715,403 | A | | 2/1998 | Stefik |
| 5,726,883 | A | * | 3/1998 | Levine et al. ................. 700/83 |
| 6,006,332 | A | * | 12/1999 | Rabne et al. ................ 713/201 |
| 6,330,670 | B1 | * | 12/2001 | England et al. ................ 713/2 |
| 6,412,008 | B1 | * | 6/2002 | Fields et al. ................. 709/228 |
| 6,516,416 | B1 | * | 2/2003 | Gregg et al. ................ 713/201 |
| 6,681,212 | B1 | * | 1/2004 | Zeng ........................... 705/51 |

FOREIGN PATENT DOCUMENTS

| EP | 1081575 | * | 3/2001 |
| JP | 9-32192 | | 12/1997 |
| JP | 11-219320 | | 8/1999 |
| WO | 97/14087 | | 4/1997 |
| WO | 97/37316 | | 10/1997 |

OTHER PUBLICATIONS

"Internet-based music distribution requires immediate improvements in copyright protection technologies", Nikkei Electronics, Issue No. 738, Mar. 8, 1999, pp. 87-111.

* cited by examiner

*Primary Examiner*—William C. Vaughn, Jr.
*Assistant Examiner*—Kyung Hye Shin
(74) *Attorney, Agent, or Firm*—Wenderoth, Lind & Ponack, L.L.P.

(57) ABSTRACT

An internal data storage unit stores distributed music data. A copyright management table stores a process right to each music data item. The process right includes a playback right and a right to copy the data to an external storage medium. A control unit refers to the stored process right to determine whether an inputted instruction can be executed. If determining that the instruction can be executed, the control unit supplies a control signal to a playback unit or another relevant process unit. A display unit displays the stored process right based on an operation mode set in a mode storage unit. The playback and copy rights to the data are displayed with icons. If an icon indicating a copyright in use is selected, information is displayed about the external medium to which the data was copied. If the inputted instruction cannot be executed, a warning screen is displayed.

3 Claims, 18 Drawing Sheets

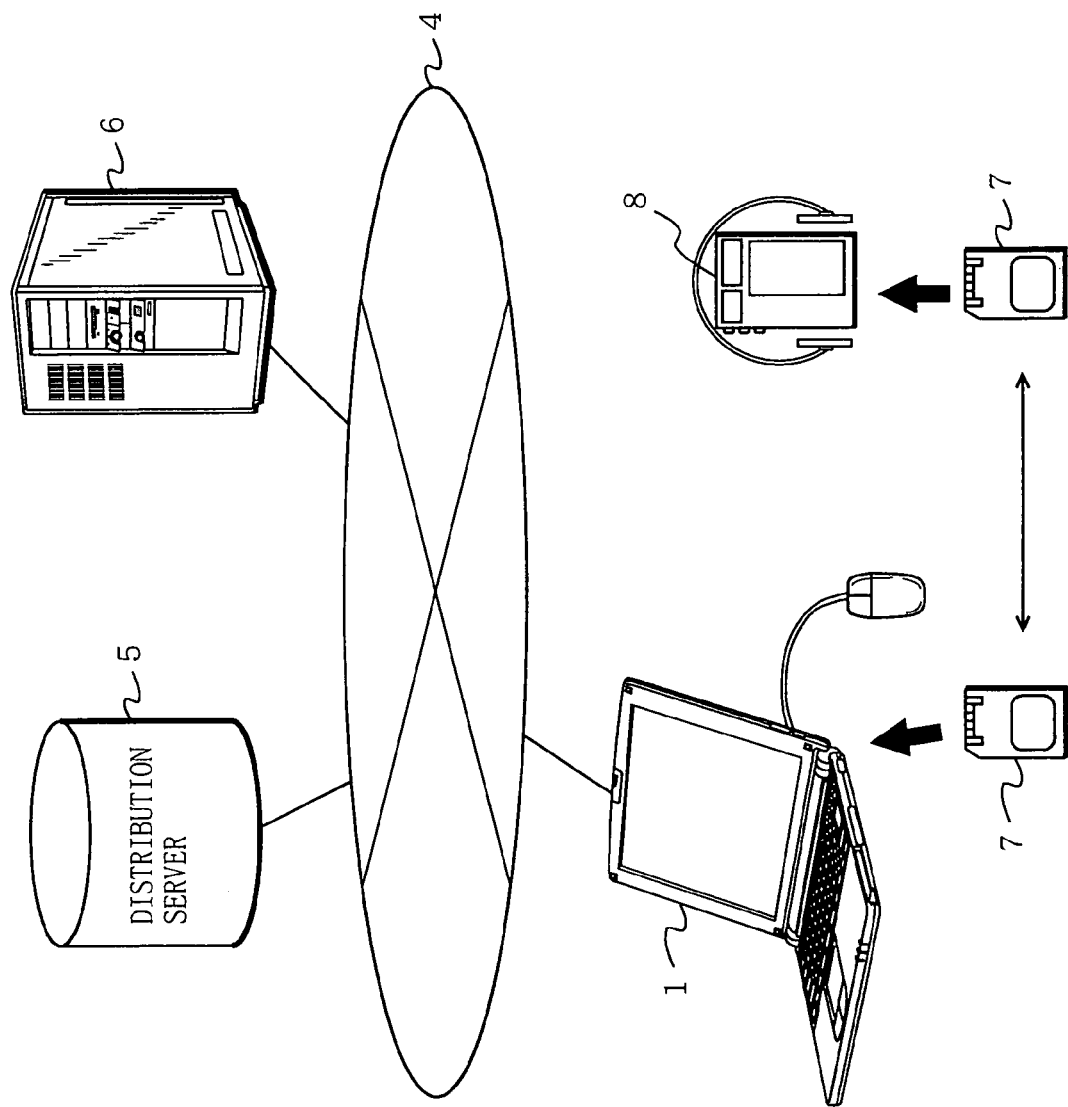

FIG. 4

| PACKAGE IDENTIFIER | CONTENT IDENTIFIER | PURCHASE CONDITION |
|---|---|---|
| 789456 | 120000001 | PLAYBACK: 10 TIMES |
| 987650 | 190000078 | PLAYBACK: 30 DAYS |
| asdre78 | 190000435 | FULL PURCHASE (3 CHECK-OUTS) |
| 987650 | 190005541 | TEST LISTENING: 10 SECONDS |
| 789457 | 190004000 | NONE |

F I G. 5

(a)

| PACKAGE IDENTIFIER | CONTENT IDENTIFIER | PURCHASE CONDITION | DATE OF RIGHT PURCHASING | DECRYPTION KEY |
|---|---|---|---|---|
| 789456 | 120000001 | PLAYBACK: 10 TIMES | 1999/8/11 | xxxxxxxx |
| 987650 | 190000078 | PLAYBACK: 30 DAYS | 1999/8/21 | yyyyyyyy |
| asdre78 | 190000435 | FULL PURCHASE (3 CHECK-OUTS) | 1999/8/22 | zzzzzzzz |
| 987650 | 190005541 | TEST LISTENING: 10 SECONDS | 1999/8/21 | uuuuuuuu |

50      51                52                            53           54

(b)

| NUMBER OF PLAYBACKS | NUMBER OF CHECK-OUTS | CHECK-OUT DESTINATION INFORMATION | | |
|---|---|---|---|---|
| 5 | 0 | — | — | — |
| 0 | 0 | — | — | — |
| 0 | 2 | SD54862 (SD Card No. 1) | DVD78951 (Children Music Collection) | — |
| 0 | 0 | — | — | — |

| PROCESS MODE | DISPLAYED CONTENTS |
|---|---|
| PLAYBACK | • CONTENT WITH PLAYBACK RIGHT THAT SATISFIES PLAYBACK CONDITION OBTAINED<br>• RIPPED CONTENT WITH CHECK-OUT RIGHT |
| CHECK-OUT | • PURCHASED CONTENT THAT SATISFIES CHECK-OUT CONDITION<br>• RIPPED CONTENT THAT SATISFIES CHECK-OUT CONDITION |
| MOVE | • PURCHASED CONTENT THAT IS NOT CHECKED-OUT<br>• RIPPED CONTENT THAT IS NOT CHECKED-OUT |

FIG. 9

| DISPLAY MODE | DISPLAY METHOD |
|---|---|
| MINIMUM DISPLAY | ·DISPLAY TITLE AND PLAYBACK DURATION OF CONTENT THAT CAN BE PROCESSED |
| SELECTION-DISABLED DISPLAY | ·DISPLAY TITLES AND PLAYBACK DURATIONS OF ALL CONTENTS<br>·DISPLAY CONTENT THAT CANNOT BE PROCESSED AS UNSELECTABLE |
| ICON DISPLAY | ·DISPLAY TITLES AND PLAYBACK DURATIONS OF ALL CONTENTS<br>·DISPLAY PROCESS RIGHT WITH ICON |
| NORMAL DISPLAY | ·DISPLAY COPYRIGHT MANAGEMENT INFORMATION FOR ALL CONTENTS IN TABLE FORM |

FIG. 10

| PROCESS MODE \ DISPLAY MODE | MINIMUM DISPLAY | SELECTION-DISABLED DISPLAY | ICON DISPLAY | NORMAL DISPLAY |
|---|---|---|---|---|
| PLAYBACK | ·DISPLAY CONTENT THAT CAN BE PLAYED BACK AT THE MINIMUM | ·DISPLAY ALL CONTENTS AT THE MINIMUM<br>·SELECTION-DISABLED DISPLAY IF CONTENT CANNOT BE PLAYED BACK | ·DISPLAY ALL CONTENTS AT THE MINIMUM<br>·DISPLAY PROCESS RIGHT WITH ICON | ·DISPLAY ALL CONTENTS IN TABLE FORM |
| CHECK-OUT | ·DISPLAY CONTENT THAT CAN BE CHECKED OUT AT THE MINIMUM | ·DISPLAY ALL CONTENTS AT THE MINIMUM<br>·SELECTION-DISABLED DISPLAY IF CONTENT CANNOT BE CHECKED OUT | | |
| MOVE | ·DISPLAY CONTENT THAT CAN BE MOVED AT THE MINIMUM | ·DISPLAY ALL CONTENTS AT THE MINIMUM<br>·SELECTION-DISABLED DISPLAY IF CONTENT CANNOT BE MOVED | | |

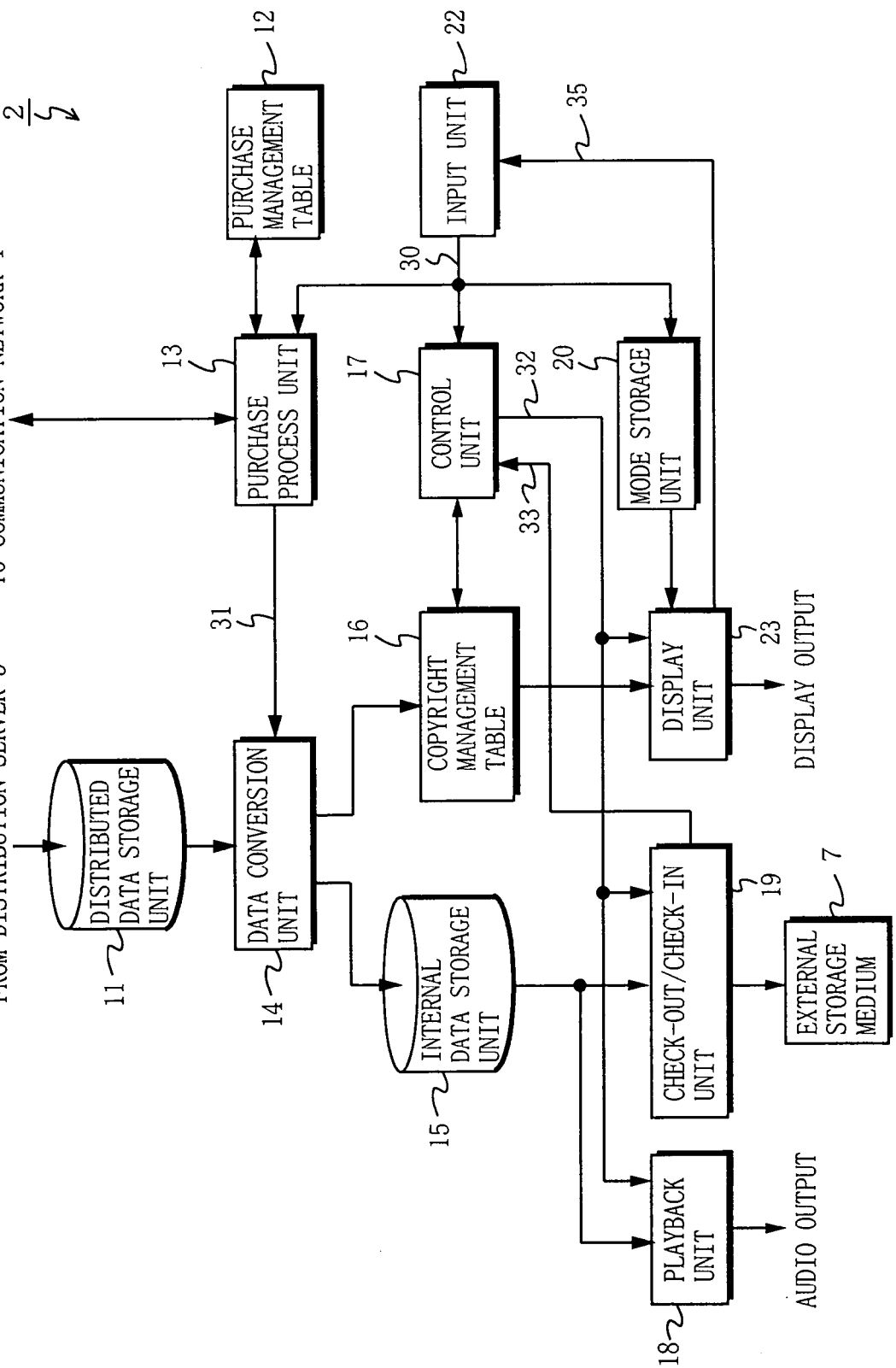

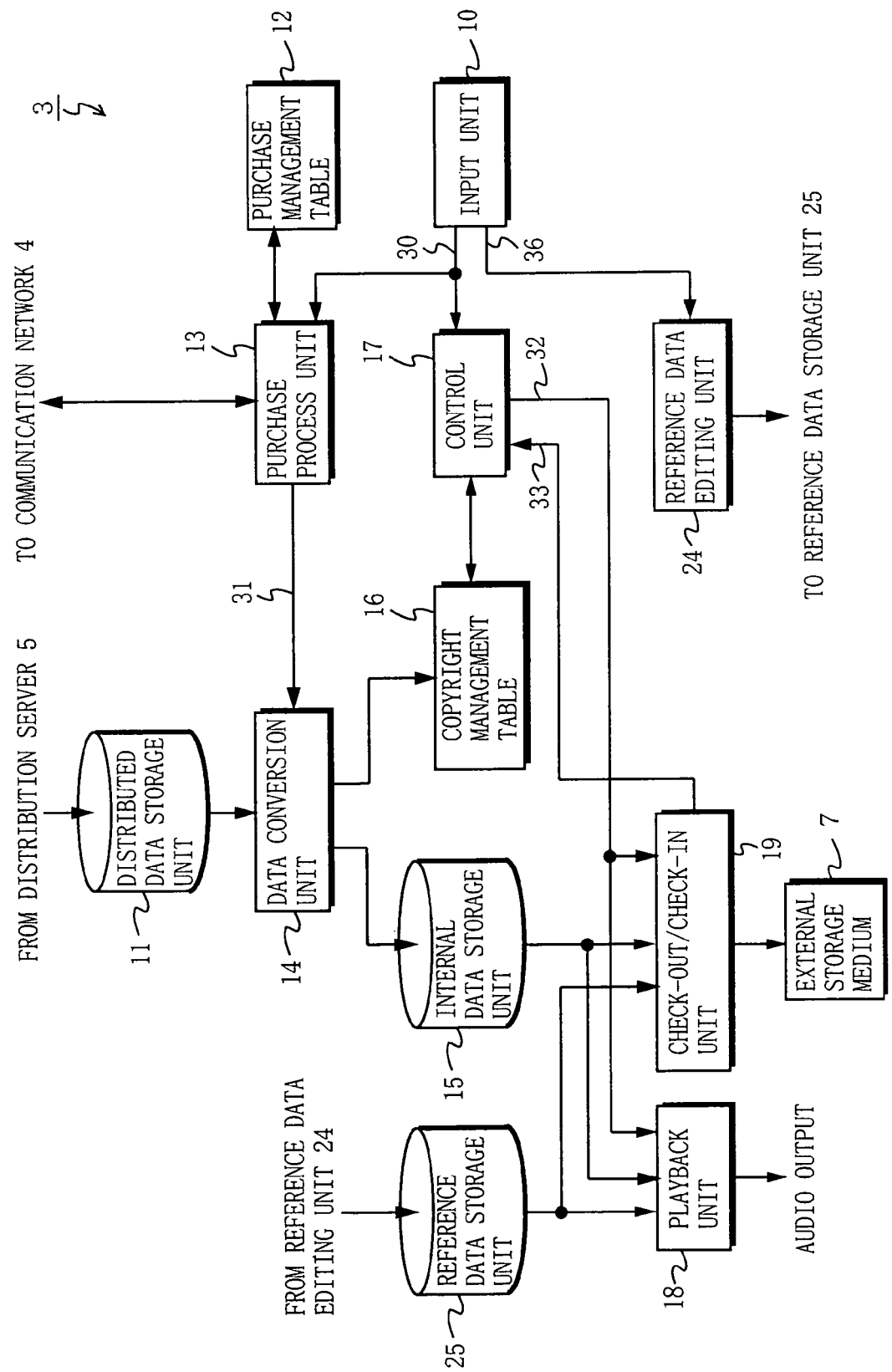

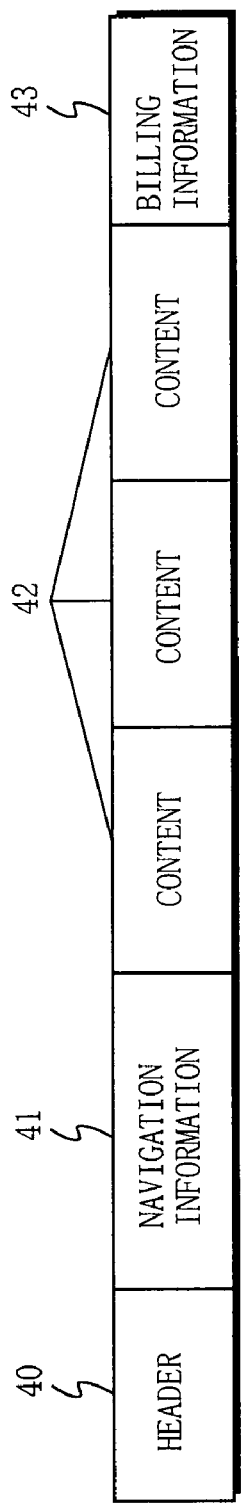
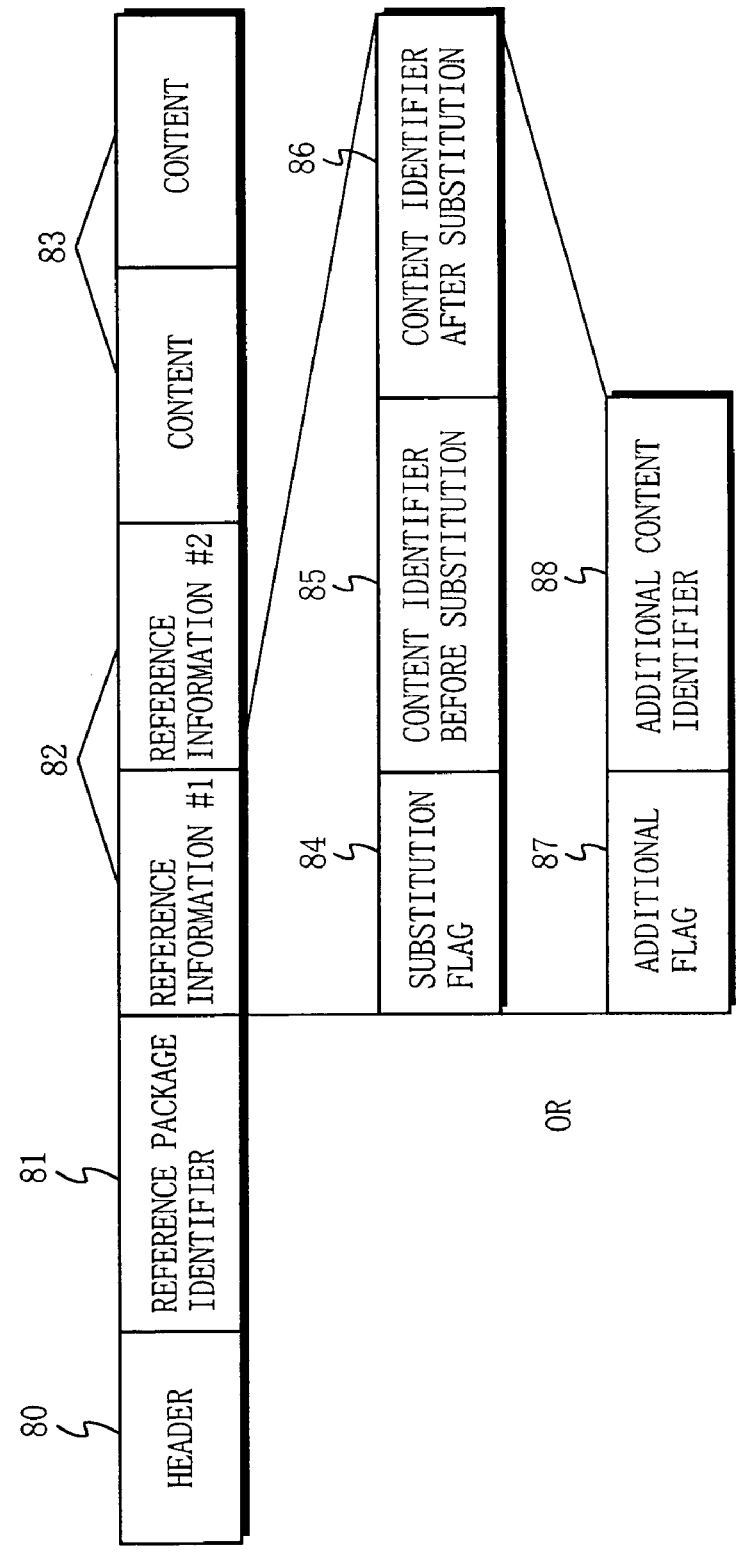

COPYRIGHTED DATA PROCESSING METHOD AND APPARATUS

BACKGROUND OF THE INVENTION

1. Field of the Invention

The present invention relates to a method and apparatus for processing copyrighted data, and more specifically, to a method and apparatus for processing copyrighted data that is distributed through a network.

2. Description of the Background Art

In recent years, various digitized information has become widely available, and a large number of digital productions have been distributed with multimedia contents including images and sounds. Such digital productions are provided for users through recording media such as CD-ROMs or communication means such as the Internet. Downloading digital productions to personal computers through a communication network is especially a convenient distribution method, and therefore this method is expected to spread increasingly. Digital productions are easy to copy without deteriorating the characteristics thereof. For this reason, copyright protection for digital productions is highly required.

The following conventional arts have been known for protecting the copyright for digital productions. A first conventional art is a contents control method which is used in a music distribution system, which has been published in "Internet-based music distribution requires immediate improvements in copyright protection technologies", Nikkei Electronics, Issue, no. 738, Mar., 8, 1999, PP. 87∝111. In the contents control method, a file containing encrypted music data (hereinafter referred to as file A) and a file containing control information, a decryption key for decrypting the file A, and other data (hereinafter referred to as file B) are distributed through a communication network. To play back the music data that is contained in the file A, it is determined, with reference to the control information contained in the file B, whether or not the file A is allowed to be played back or copied.

FIG. 17 is a block diagram showing the structure of a data processing apparatus which uses the first conventional art. The data processing apparatus shown in FIG. 17 is connected to a communication network (not shown) when the data processing apparatus is in use. A distributed data storage unit 101 stores the file A that is distributed through a communication network such as the Internet and CATV (Cable TV). A copyright management table 102 stores the file B that is distributed through the communication network in relation to the file A. A purchase process unit 103 communicates with a billing server (not shown) to purchase a process right that is required for playback and other processes, and records the purchased process right in the copyright management table 102. When an instruction is inputted by an input unit 104, a control unit 105 determines, with reference to the process right recorded in the copyright management table 102, whether the instruction is to be executed or not. A playback unit 106 receives a decryption key that is contained in the file B from the control unit 105, and plays back the music data that is contained in the file A.

As a second conventional art, a method of preventing unauthorized copying of digital data by encrypting the digital data has been known, which is disclosed in Japanese Patent Laid-Open Publication No. 9-320192 (1997-320192). FIG. 18 is a diagram showing the structure of a copyright protection apparatus according to the second conventional art. The copyright protection apparatus shown in FIG. 18 is characterized in that digital data that is read from a disk 111 is encrypted before being placed on a bus 114. In other words, a data format unit 112 provides the data that is read from the disk 111 with encryption start information, an encryption key, information about a unit of encryption, copy management information indicating whether data copying is allowed or not, and identification information of an encryption algorithm to be used. An encryption unit 113 encrypts the data by using the encryption key that is provided by a key delivery unit 110. The encrypted data flows on the bus 114. A decryption unit 115 decrypts the data by using a decryption key that is provided by the key delivery unit 110. The decrypted data is restored by a data format unit 116 to the state in which the digital data was read from the disk 111, and then the restored data is played back by a playback unit 117.

As such, according to the first conventional art, received copyrighted data can be processed within a purchased process right, while, according to the second conventional art, copyrighted data can be protected from unauthorized copying.

In these conventional arts, however, the process right that is required for processing copyrighted data is not presented to the user in an appropriate manner. Therefore, the user cannot recognize which process can be executed on each data item.

SUMMARY OF THE INVENTION

Therefore, an object of the present invention is to provide a copyrighted data processing method and apparatus with an operability which is improved by displaying a process right for copyrighted data on a screen in an appropriate manner of representation.

The present invention has the following features to achieve the object described above.

A first aspect of the present invention is directed to a data processing apparatus for executing a process on copyrighted data within an obtained right. The data processing apparatus comprises a data storage unit which is operable to store the data, and a right information storage unit which is operable to store a process right that is required for executing the process on the data that is stored in the data storage unit. The data processing apparatus also comprises an input unit which is operable to input an instruction on the data that is stored in the data storage unit, and a control unit which is operable to determine, based on the process right that is stored in the right information storage unit, whether the instruction is to be executed or not. The data processing apparatus further comprises a process execution unit which is operable to execute the instruction, and a display unit which is operable to display the process right that is stored in the right information storage unit on a screen. Therefore, the user can easily recognize which process can be executed on each data item.

The data processing apparatus may further include a data receiving unit for receiving the data that is stored in the data storage unit through a communication channel, and for obtaining the process right that is stored in the right information storage unit through the communication channel. Therefore, the user can easily recognize which process can be executed on each data item that is received from the communication channel.

Furthermore, the process execution unit may include a data copy unit for copying the data that is stored in the data storage unit to a removable storage medium, and for deleting the data that is copied to the storage medium based on a determination by the control means. Therefore, the user can easily recognize whether or not each data item can be copied to the external storage medium and deleted therefrom.

In this case, the right information storage unit may store storage medium information for identifying the storage medium, and the display unit may display the storage medium information on a screen. More preferably, when the input unit selects the data that is copied to the storage medium, the display unit may display the storage medium information of the storage medium on the screen. As the storage medium information, a storage medium identifier which is unique to the storage medium or an identifier that is assigned to the storage medium for identification may be used. Therefore, the user can easily recognize to which external storage medium the data has been copied.

Still further, the control unit may output a warning signal when determining that the instruction for copying the data to the storage medium or deleting the data from the storage medium is not to be executed, and the display unit may display a warning screen based on the warning signal. More preferably, the display unit may make a display on the screen for prompting a user to obtain a process right that is required for copying the data. Therefore, the user can easily recognize that the data copy instruction or the data deletion instruction has not been executed, and the user can immediately obtain a right to copy the data through the warning screen.

Still further, the display unit may display one or more icons on the screen corresponding to the process right that is stored in the right information storage unit. More preferably, the display unit may display as many icons on the screen as the number of executions which are specified by the process right that is stored in the right information storage unit. Therefore, the user can easily recognize the limit on the number of executions which are specified by the process right.

Still further, the display unit may display on the screen the process right to data that can be processed in a set process mode. Also, the display unit may display on the screen the process right that is stored in the right information storage unit by switching a display method based on the set display mode. Therefore, only the data that can be processed is displayed, thereby preventing the user from erroneously inputting an instruction for data that cannot be processed.

Still further, the control unit may output a warning signal when determining that the instruction is not to be executed, and the display unit may display a warning screen based on the warning signal. Therefore, the user can easily recognize that the instruction has not been executed.

A second aspect of the present invention is directed to a data processing method for executing a process on copyrighted data within an obtained right. The data processing method comprises the steps of: storing the data; storing a process right that is required for executing the process on the data that is stored in the data storing step; inputting an instruction for the data that is stored in the data storing step; determining, based on the process right that is stored in the process right storing step, whether the instruction is to be executed or not; executing the instruction; and displaying the process right that is stored in the process right storing step on a display.

A third aspect of the present invention is directed to a recording medium on which a program is recorded for executing, on a computer, the data processing method of the second aspect of the present invention.

According to the second or third aspect of the present invention, the user can easily recognize which process can be executed on each data item.

As stated above, the copyrighted data processing method and apparatus according to the present invention provide the user with excellent usability, which is quite effective in practical use.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing the structure of a music distribution system using the data processing apparatus;

FIG. 4 is a diagram exemplarily showing a purchase management table in the data processing apparatus;

FIG. 5 is a diagram exemplarily showing a copyright management table in the data processing apparatus;

FIG. 8 is a table showing a correlation between a process mode and displayed contents in the data processing apparatus;

FIG. 9 is a table showing a correlation between display modes and display methods in the data processing apparatus;

FIG. 10 is a table showing a correlation between the process and display modes and the display methods in the data processing apparatus;

FIG. 12 is a block diagram showing the structure of a data processing apparatus according to a second embodiment of the present invention;

FIG. 15 is a block diagram showing the structure of a data processing apparatus according to a third embodiment of the present invention;

FIGS. 16a and 16b are diagrams showing formats of reference data to be handled by the data processing apparatus according to the third embodiment;

DETAILED DESCRIPTION OF THE INVENTION

First Embodiment

Figure 1:
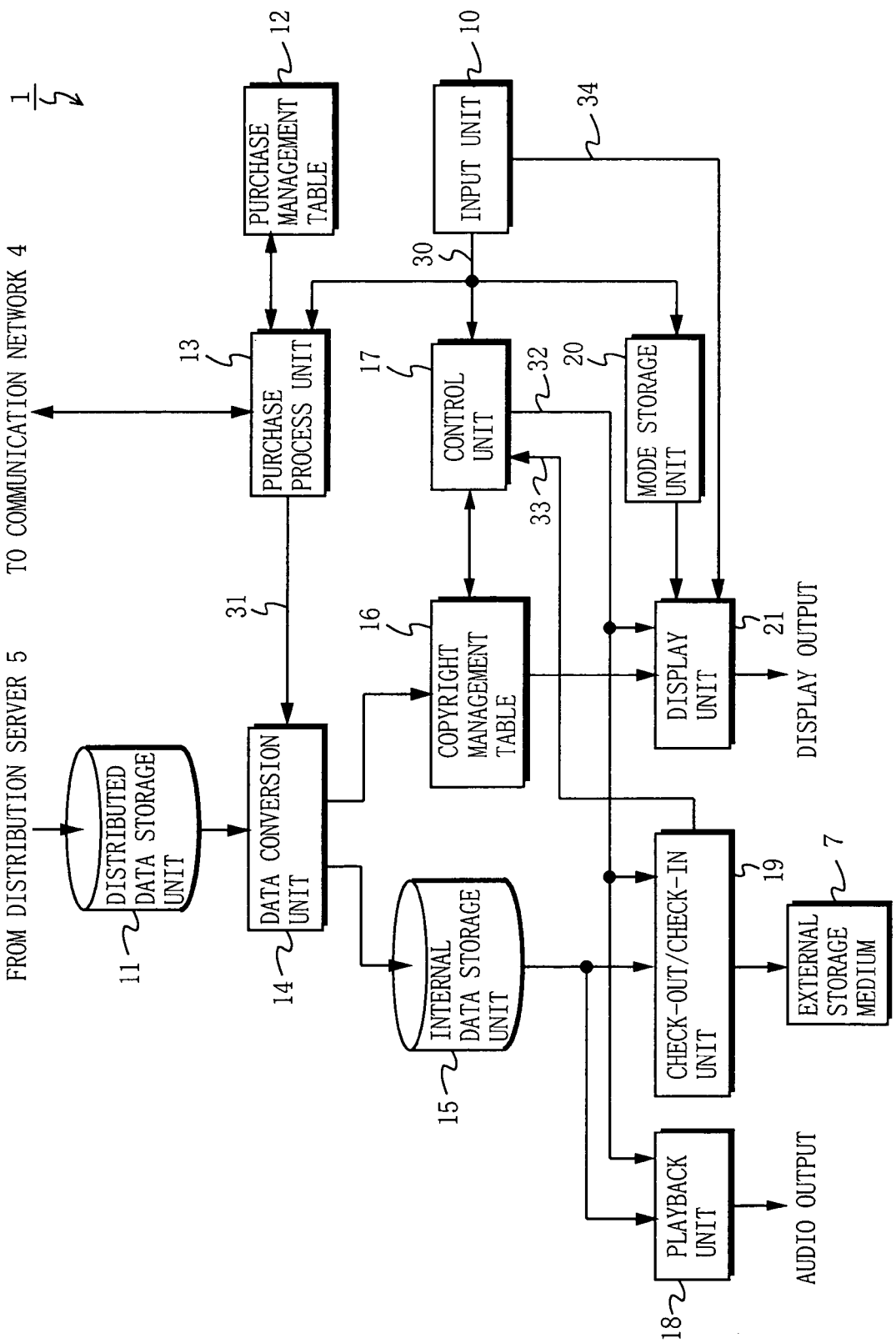
FIG. 1 is a block diagram showing the structure of a data processing apparatus according to a first embodiment of the present invention.

FIG. 1 is a block diagram showing the structure of the data processing apparatus according to a first embodiment of the present invention. The data processing apparatus 1 shown in FIG. 1 includes an input unit 10, a distributed data storage unit 11, a purchase management table 12, a purchase process unit 13, a data conversion unit 14, an internal data storage unit 15, a copyright management table 16, a control unit 17, a playback unit 18, a check-out/check-in unit 19, a mode storage unit 20, and a display unit 21. The data processing apparatus 1 carries out playback, copying, and other processes that are executed on distributed copyrighted music data, and is characterized in that a process right to the distributed music data is displayed on a screen.

Prior to a detailed description of the data processing apparatus 1, a music distribution system using the data processing apparatus 1 and formats of music data that are handled in the data processing apparatus 1 are now described with reference to FIGS. 2 and 3.

As shown in FIG. 2, the data processing apparatus 1 is connected through a communication network 4 to a distribution server 5 and a billing server 6. The communication network 4 is a network such as the Internet, or a network for CATV (Cable TV), satellite communications, or cellular phones. The distribution server 5 stores a large amount of copyrighted music data. In response to a request from the data processing apparatus 1, the distribution server 5 distributes the music data to the data processing apparatus 1. The billing server 6 carries out a billing process for the distributed music data. External storage media 7 are structured so as to be removable from both the data processing apparatus 1 and a portable music player 8. The data processing apparatus 1 identifies each external storage medium 7 by using a storage medium identifier which is unique to each medium 7 or a label name which is specified by the user for each medium 7.

Copyright management for music data is now briefly described below. The distribution server 5 distributes encrypted music data and a decryption key for decrypting the distributed music data to the data processing apparatus 1. The data processing apparatus 1 transmits information that the user agrees to pay for the music data to the billing server 6 before or after distribution of the music data so as to purchase a process right to the distributed music data. For example, the data processing apparatus 1 plays back the music data by using the decryption key as many times as the number of playbacks which are specified by the purchased right.

Moreover, the data processing apparatus 1 can copy the music data and its decryption key to the external recording medium 7 (such processing is hereinafter referred to as check-out) and delete the copied music data from the external recording medium 7 (such processing is hereinafter referred to as check-in). The data processing apparatus 1 can check out the music data as many times as the number of check-outs which are specified by the purchased right. A check-out right that allows a check-out once is recovered when the checked-out data is checked in. However, the music data can be checked in only by the data processing apparatus that has checked out the music data. Moreover, if the external storage medium to which edit-protected music data is checked out is written upon, the data processing apparatus 1 does not check in the music data.

Furthermore, the data processing apparatus 1 can also transfer the music data, decryption key, and process right together at once to another data processing apparatus (such processing is hereinafter referred to as move). After a move process, no process right remains in the data processing apparatus 1.

Figure 3A:
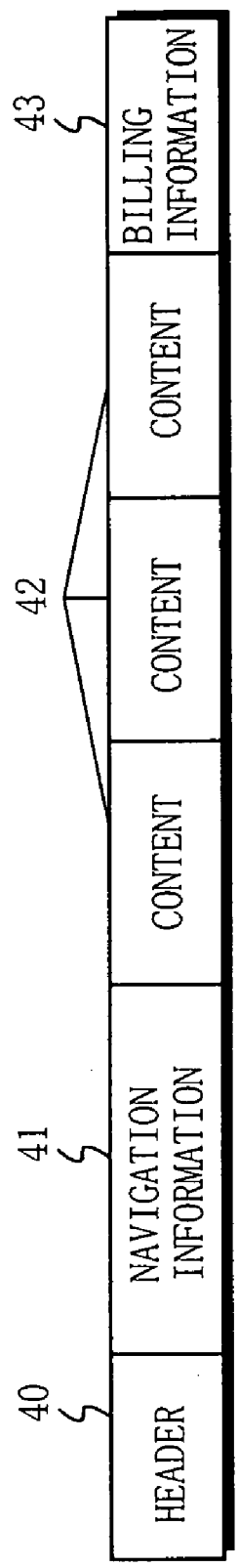
FIGS. 3a to 3c are diagrams showing formats of music data to be handled by the data processing apparatus.
Figure 3B:
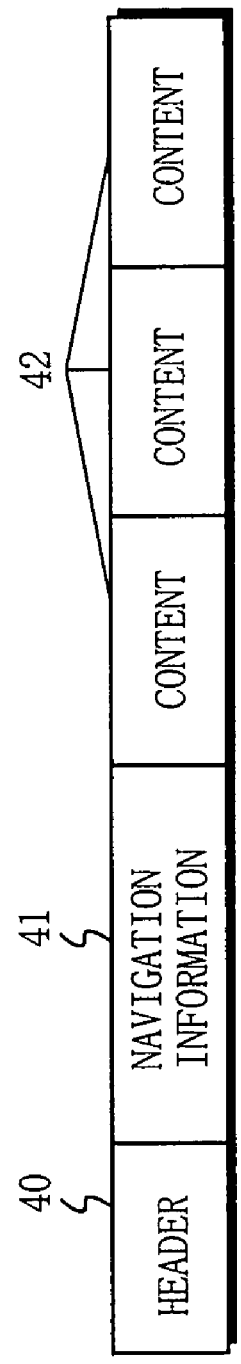
Figure 3C:
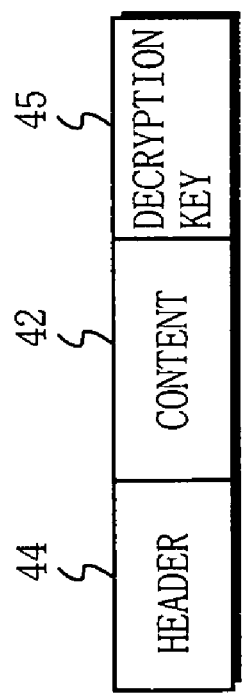

The music data that is handled by the data processing apparatus 1 includes, in addition to audio contents, contents such as video, images, text, and programs. FIGS. 3a to 3c are diagrams showing three music data formats that are handled by the data processing apparatus 1. A distribution format shown in FIG. 3a is used for distributing the music data. An internal format shown in FIG. 3b is used for storing the music data in the data processing apparatus 1. A copy format shown in FIG. 3c is used for checking out the music data to the external storage medium 7.

The music data is distributed to the data processing apparatus 1 by a unit called a package. In the distribution format shown in FIG. 3a, the package is composed of four data items: a header 40, navigation information 41, one or more contents 42, and billing information 43. The header 40 includes information such as a package identifier for identifying the package and information about the position and size of other data. The content 42 is content data such as audio, video, images, text, or programs. Each content has its own content identifier that is unique within the package, and is encrypted as required.

The navigation information 41 is used as playback control information which is used for controlling music data playback. The content identifier is used for referring to each content 42 from the navigation information 41. A content that is included in the package to which the navigation information belongs is referred to only with its content identifier, while a content in another package is referred to with its package identifier and content identifier. The billing information 43 includes a use condition, price, and decryption key for each content 42.

In the data processing apparatus 1, the music data is handled with the billing information 43 removed therefrom. In the internal format shown in FIG. 3b, the music data is composed of the header 40, the navigation information 41, and the one or more contents 42.

The music data is converted into a format which is appropriate to the type of the external recording medium 7 before being checked out to the external recording medium 7. For example, if the external storage medium 7 is an SD (Secure Digital) memory card, the music data is converted into a format so that audio contents for the SD memory card are included and video contents are not included therein. In the copy format shown in FIG. 3c, the music data is composed of a header 44, the content 42, and the decryption key 45. The header 44 conforms to the type of the external storage medium 7. The decryption key 45 is extracted from the billing information 43 in the distribution format. The content 42 is content data that is selected based on the type of the external storage medium 7 from the music data in the internal format. The music data shown in FIG. 3c includes only a single content 42, but the music data may include two or more contents. When the music data is checked out, the music data in the copy format may be divided into a plurality of files for copying.

In addition to the content data that is distributed by the distribution server 5, content data that is read from CDs may be processed by the data processing apparatus 1. Such data are called ripped contents.

Referring back to FIG. 1, the structure of the data processing apparatus 1 is described below. The operation of the data processing apparatus 1 is now briefly described. The distributed music data is converted into an internal format by the data conversion unit 14, and then the converted music data is stored in the internal data storage unit 15. Information about the right to process each content that is included in the music data is recorded in the copyright management table 16. The control unit 17 refers to the copyright management table 16 to determine whether an inputted instruction 30 is to be executed or not. If the control unit 17 determines that the instruction is to be executed, the control unit 17 makes an instruction for starting playback, check-out, and other processes.

The user inputs the instruction 30 for the content with the input unit 10. The instructions described in the first embodiment are those for distribution, purchasing, playback, check-out, check-in, move, and mode setting. In addition, other examples include instructions for data classification, data editing, data search, import, export, adding user data, taking in ripped contents, and an authorization check. Furthermore, the input unit 10 outputs position information 34 that is obtained from a pointing device such as a mouse.

The distributed data storage unit 11 stores music data in a distribution format that is distributed by the distribution server 5. The purchase management table 12 stores, as shown in FIG. 4, a package identifier 50, a content identifier 51, and a purchase condition 52 as a set for each content that is included in the music data which is stored in the distributed data storage unit 11. The purchase condition is specified at the purchase of the content. For example, such a purchase condition includes playback only, full purchase, or test-listening. If the purchase condition is playback only, the content can be played back only a specified number of times or only in a specified period. If the purchase condition is full purchase, the content can be freely played back and checked out only a specified number of times. If the purchase condition is test-listening, the content can be played back an unlimited number of times within a specified time period.

When receiving the instruction 30 for purchasing from the input unit 10, the purchase process unit 13 sends information that the user agrees to pay for the music data to the billing server 6 so as to purchase a right to the distributed music data. Thereafter, the purchase processing unit 13 records the purchased process right in the purchase management table 12. If the specified content is not stored in the distributed data storage unit 11, the purchase process unit 13 requests the distribution server 5 to distribute the music data containing the specified content. After receiving the specified music data, the purchase processing unit 13 provides the data conversion unit 14 with a control signal 31 for instructing that a data conversion be carried out for the specified music data.

Upon receiving the control signal 31, the data conversion unit 14 converts the specified music data into the internal format. In other words, the data conversion unit 14 separates the billing information 43 from the distributed package so as to obtain the music data in the internal format. The data conversion unit 14 also extracts the decryption key for each content from the billing information 43, and records the decryption key in the copyright management table 16.

The internal data storage unit 15 stores the music data in the internal format that is outputted from the data conversion unit 14. The stored music data is to be played back, checked out, etc.

The copyright management table 16 stores, as shown in FIG. 5, copyright management information for each content that is stored in the internal data storage unit 15. The copyright management table 16 includes the package identifier 50, the content identifier 51, the purchase condition 52, the date of right purchasing 53, a decryption key 54, the number of playbacks 55, the number of check-outs 56, and check-out destination information 57. Note that FIG. 5 shows a single table that is divided into two parts indicated by (a) and (b), and in the table before being divided, the number of playbacks 55 follows the decryption key 54.

The package identifier 50, the content identifier 51, and the purchase condition 52 are the same data as those that are stored in the purchase management table 12. The date of right purchasing 53 indicates the date of purchasing the content. The decryption key 54 is used to decrypt the encryption of the content, i.e., the encrypted music data. The number of playbacks 55 indicates the number of times the content has been played back. The number of check-outs 56 indicates the number of times the content has been checked out. The check-out destination information 57 includes a storage medium identifier and a label name for the external storage medium to which the content has been checked out. The label name is assigned to the external storage medium when the music data is first checked out thereto.

The package identifier 50, the content identifier 51, the purchase condition 52, the date of right purchasing 53, and the decryption key 54 are set to predetermined values when new music data is stored in the internal data storage unit 15. The number of playbacks 55 and the number of check-outs 56 are initialized to 0, while the check-out destination information 57 is cleared. The copyright management table 16 is encrypted with an encryption method which is unique to the data processing apparatus 1 for protection against data tampering.

The control unit 17 refers to the copyright management table 16 to determine whether the instruction 30 is to be executed or not. When the control unit 17 determines that the instruction 30 is to be executed, the control unit 17 makes an instruction for starting playback or check-out. With reference to a flowchart shown in FIG. 6, the operation of the control unit 17 is now described. When receiving the instruction 30 for the content (step S101), the control unit 17 reads the copyright management information of that content from the copyright management table 16 (step S102). The control unit 17 then uses the read copyright management information to determine whether the instruction 30 is to be executed or not (step S103). For example, when receiving a playback instruction, the control unit 17 refers to the number of allowable playbacks or the allowable playback period that are included in the purchase condition 52. If the number of playbacks is not more than the number of allowable playbacks or if the present date is within the allowable playback period after the date of right purchasing 53, the control unit 17 determines that the playback instruction is to be executed. When the control unit 17 determines that the instruction is to be executed, the control unit 17 updates the number of playbacks 55, the number of check-outs 56, or other relevant items that are included in the copyright management table 16 (step S104). The control unit 17 then outputs a control signal 32 for starting the process to a relevant process execution unit (step S105). At this time, the control unit 17 also outputs the decryption key 54 that is read from the copyright management table 16 as being included in the control signal 32. On the other hand, when the control unit 17 determines that the instruction is not to be executed, the control unit 17 outputs the control signal 32 for a warning display to the display unit 21 (step S106).

When the playback unit 18 receives the control signal 32 for starting playback, the playback unit 18 reads the specified content from the music data that is stored in the internal data storage unit 15, and plays back the content by using the received decryption key 54.

When the check-out/check-in unit 19 receives the control signal 32 for starting check-out, the check-out/check-in unit 19 reads the specified content from the music data that is stored in the internal data storage unit 15, converts the music data to the copy format, and writes the converted music data in the external storage medium 7. When the check-out/check-in unit 19 receives the control signal 32 for starting check-in, the check-out/check-in unit 19 deletes the music data that is copied to the external storage medium 7.

The check-out/check-in unit 19 also reads the storage medium identifier 33 from the external storage medium 7, and outputs the storage medium identifier 33 to the control unit 17. The control unit 17 records the received storage medium identifier 33 in the copyright management table 16 after check-out. The control unit 17 also determines before check-in whether a check-in can be performed or not, depending on whether the received storage medium identifier 33 has been recorded in the copyright management table 16 or not.

For switching a screen display by the display unit 21, a mode storage unit 20 stores two types of mode information: a process mode and a display mode. Such mode information is set by the instruction 30 for mode setting. Alternatively, such mode information may be automatically set based on the inputted instruction 30. The display unit 21 generates a screen for displaying the process right based on the copyright information that is stored in the copyright management table 16, and displays the screen on a CRT or liquid crystal display.

Figure 7:
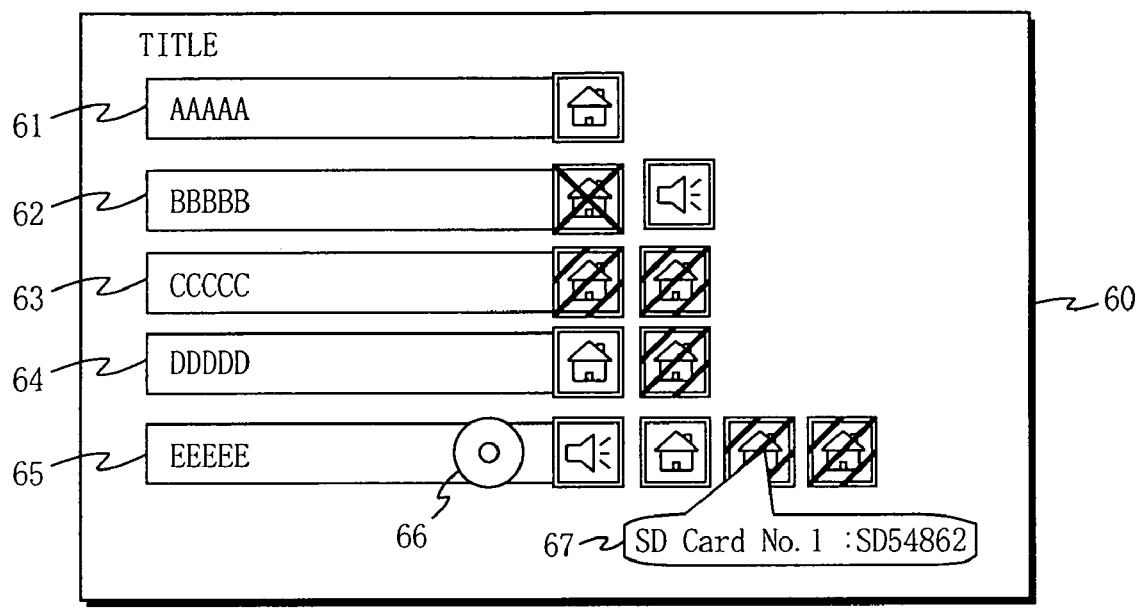
FIG. 7 is a diagram exemplarily showing a display screen of the data processing apparatus.

FIG. 7 is a diagram showing an example of a screen that is displayed on the display unit 21. On a display screen 60 shown in FIG. 7, titles and process rights for five contents 61 to 65 are displayed. The titles are displayed by using character strings, while the process rights are displayed by using icons. The check-out right that allows a check-out of the content once is displayed by using a square icon with a picture representing a house therein. An unused check-out right is displayed by using an icon 68 without hatching, while a used check-out right (that is, a check-out has been carried out by using this check-out right) is displayed by using a hatched icon 69. If no check-out right is available, an icon 70 with a cross placed thereon is used. A playback right to the content is displayed by using a square icon 71 with a picture representing a speaker therein.

Through the display screen 60 as shown in FIG. 7, it can be easily recognized that each content can be processed as follows. A content 61 titled "AAAAA" can be checked out only once. A content 62 titled "BBBBB" can be played back but cannot be checked out. A content 63 titled "CCCCC" cannot be checked out because its two check-out rights are being used. A content 64 titled "DDDDD" can be checked out only once because one of the two check-out rights is now in use. A content 65 titled "EEEEE" can be checked out only once and played back.

An icon 66 shaped like a CD indicates that a content attached thereto has been ripped from a CD. Therefore, the icon 66 shown in FIG. 7 indicates that the content 65 is a ripped content. A comment display 67 indicates a storage medium identifier and label name of the external storage medium to which the content is checked out. Therefore, the comment display 67 shown in FIG. 7 indicates that the content 65 has been checked out to the external storage medium 7 with a storage medium identifier SD54862. The comment display 67 is displayed when the pointing device (e.g. a mouse) points to the icon that indicates the check-out that is currently being used.

FIG. 8 is a table showing a correlation between the process modes that are set in the mode storage unit 20 and the contents that are displayed in each process mode. The process mode is, as shown in FIG. 8, either one of playback, check-out, or move. In the playback mode, contents whose playback right has been obtained and which satisfy a playback condition are displayed together with ripped contents that can be checked out. In the check-out mode, purchased or ripped contents that satisfy a check-out condition are displayed. In the move mode, purchased or ripped contents that have not been checked out are displayed.

FIG. 9 is a table showing a correlation between the display modes that are set in the mode storage unit 20 and display methods in these display modes. The display mode is, as shown in FIG. 9, either one of minimum display, selection-disabled display, icon display, or normal display. In the minimum display mode, only the titles and playback durations of contents that can be processed are displayed. In the selection-disabled display, titles and playback durations of all of the contents are displayed, but contents that cannot be processed are differently displayed, for example, in gray. In the icon display, in addition to the titles and playback durations of all of the contents, the process rights to all of the contents are displayed with icons. In the normal display, copyright management information for all of the contents is displayed in a table form.

As shown in FIG. 10, the display unit 21 switches the screen display based on the process mode and the display mode that are set in the mode storage unit 20. The display screen 60 shown in FIG. 7 is in the icon display. The table shown in FIG. 10 is only an example for screen switching, and the screen switching method of the present invention is not limited thereto.

Figure 11:
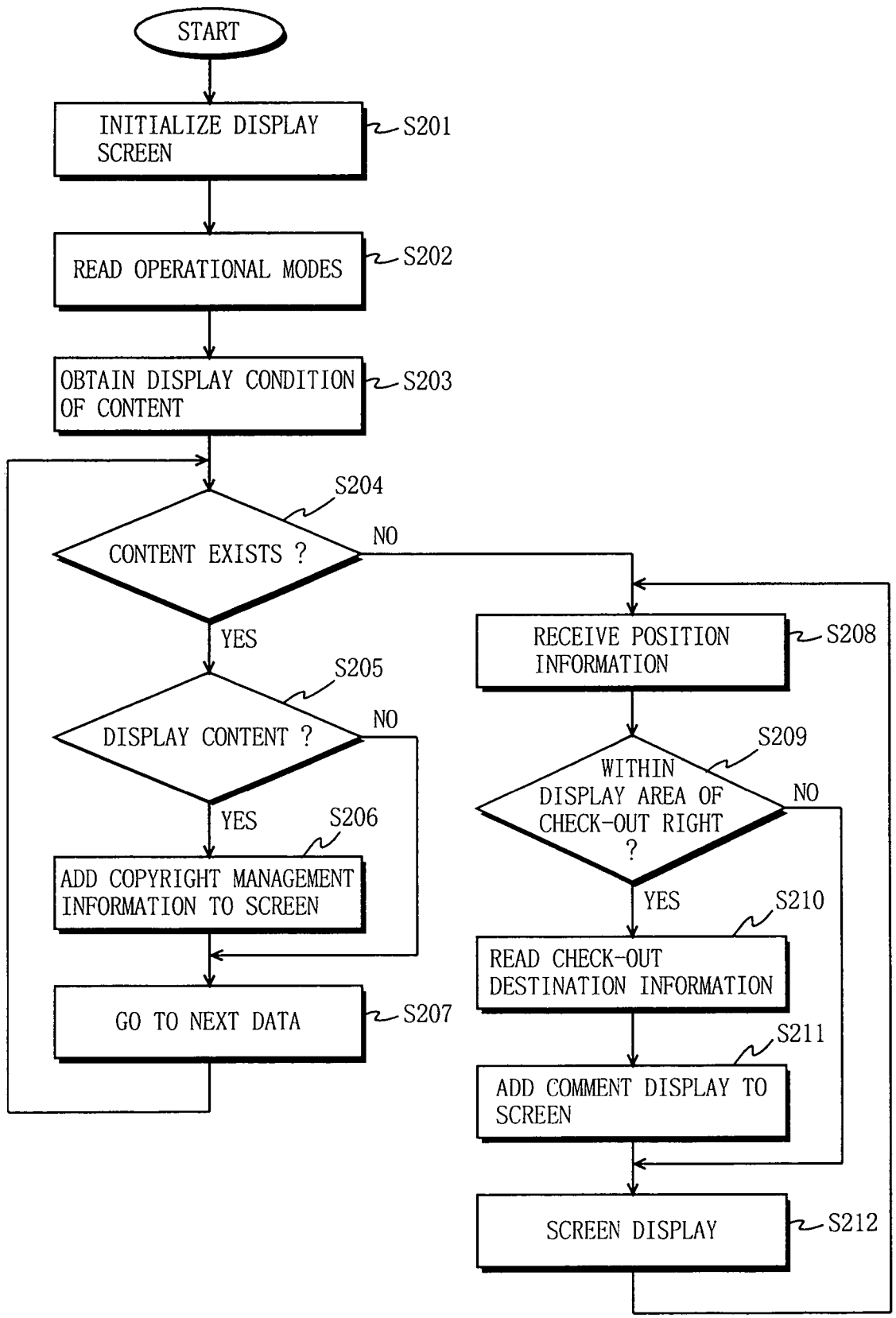
FIG. 11 is a flowchart showing the operation of a display unit in the data processing apparatus.

With reference to a flowchart shown in FIG. 11, the operation of the display unit 21 is now described. The display unit 21 first initializes a display screen (step S201). Then, the display unit 21 reads the process mode and the display mode from the mode storage unit 20, i.e., reads the operational modes (step S202). The display unit 21 then obtains the condition for displaying the content by referring to the table shown in FIG. 10 with the read two types (the process mode and the display mode) of the operational modes (step S203). The display unit 21 then determines whether the condition that is obtained in step S203 is satisfied or not for each content in the copyright management table 16 (step S205), and adds the copyright management information of the content satisfying the condition to the display screen (step S206). In step S206, a character string indicating the title and an icon indicating the process right are added to the display screen based on the display mode. Steps S204 through S207 are repeated until all of the contents are examined.

Once all of the contents are examined, the display unit 21 then receives position information 34 from the input unit 10 (step S208). The position information 34 indicates a position that is inputted on the screen by the pointing device such as a mouse. The display unit 21 determines whether or not the position that is indicated by the position information 34 is located within an area in which the icon that is indicative of the check-out right in use is displayed (step S209). If the position is within that area, the display unit 21 reads the check-out destination information 57 from the copyright management table 16 (step S210), and adds the comment display 67 to the display screen (step S211). If the position is not within that area, the display unit 21 does not add the comment display 67 to the display screen. Thereafter, the display unit 21 displays the whole screen (step S212). Thus, the display screen 60 is displayed as shown in FIG. 7.

As stated above, the data processing apparatus 1 according to the first embodiment processes the distributed content within the obtained process right, and displays the process right to each content. Therefore, the user can easily recognize which process can be executed for each content. Furthermore, the user can set the mode information so as to switch the display mode for displaying the right. Therefore, only the processable contents can be displayed, thereby preventing an erroneous input of an instruction for a content that cannot be processed. Still further, when a mode for displaying an icon for each right that allows execution once is selected, the user can easily recognize the limit on the number of executions which are specified by the right. Still further, the information about the external storage medium to which the content has been checked out is displayed. Therefore, the user can easily recognize to which external storage medium the music data has been checked out.

In the first embodiment, one icon is displayed for each right that allows execution once. Alternatively, the number of executions which are specified by the right may be numerically expressed for display, thereby allowing a large number of executions to be displayed in a smaller area. Moreover, although the label name of the external storage medium is displayed as a character string in the first embodiment, the label name may alternatively or also be displayed as image data. A label with such a character string or image data printed thereon may be affixed to the external storage medium for easy identification.

Second Embodiment

FIG. 12 is a block diagram showing the structure of a data processing apparatus according to a second embodiment of the present invention. The data processing apparatus 2 shown in FIG. 12 includes an input unit 22, the distributed data storage unit 11, the purchase management table 12, the purchase process unit 13, the data conversion unit 14, the internal data storage unit 15, the copyright management table 16, the control unit 17, the playback unit 18, the check-out/check-in unit 19, the mode storage unit 20, and a display unit 23. The data processing apparatus 2 of the second embodiment is used in the same music distribution system as the music distribution system for the data processing apparatus 1 according to the first embodiment. The data processing apparatus 2 is characterized in that a warning screen is displayed when a process is not allowed. The components in the second embodiment which are identical to those in the first embodiment are provided with the same reference numerals, and their description is omitted herein.

Figure 13A:
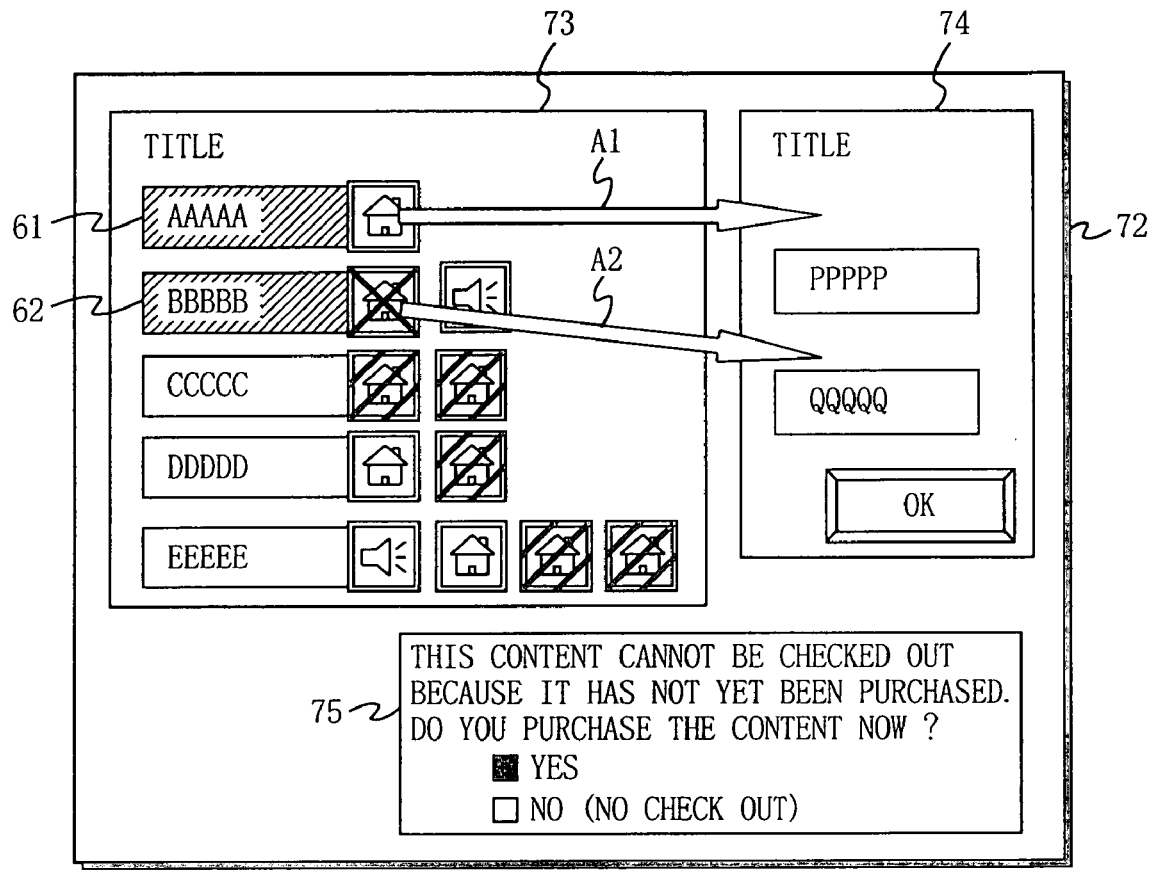
FIGS. 13a and 13b are diagrams exemplarily showing display screens during and after a check-out process that is carried out by the data processing apparatus according to the second embodiment.
Figure 13B:
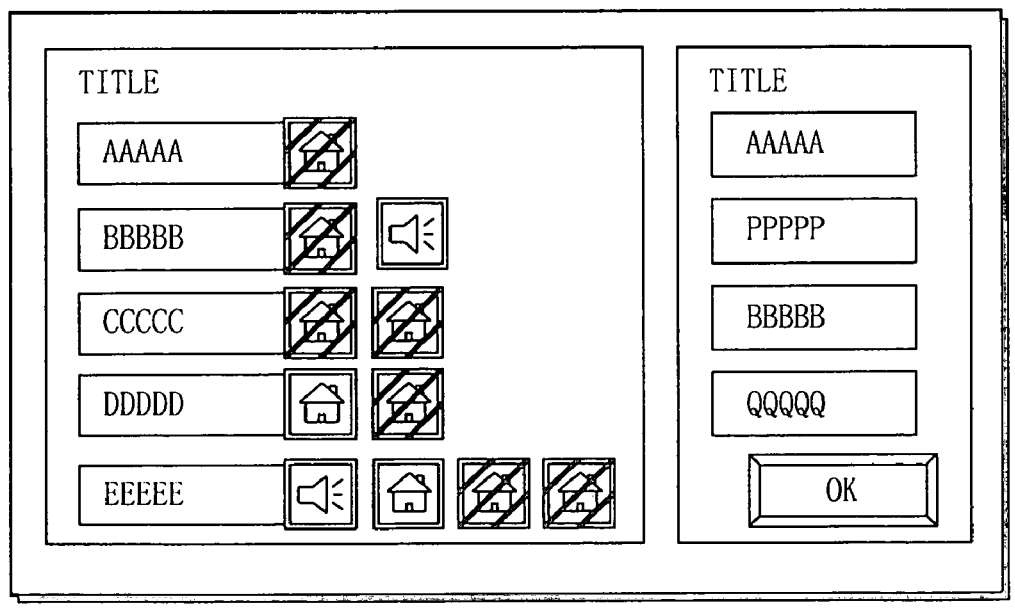
Figure 14A:
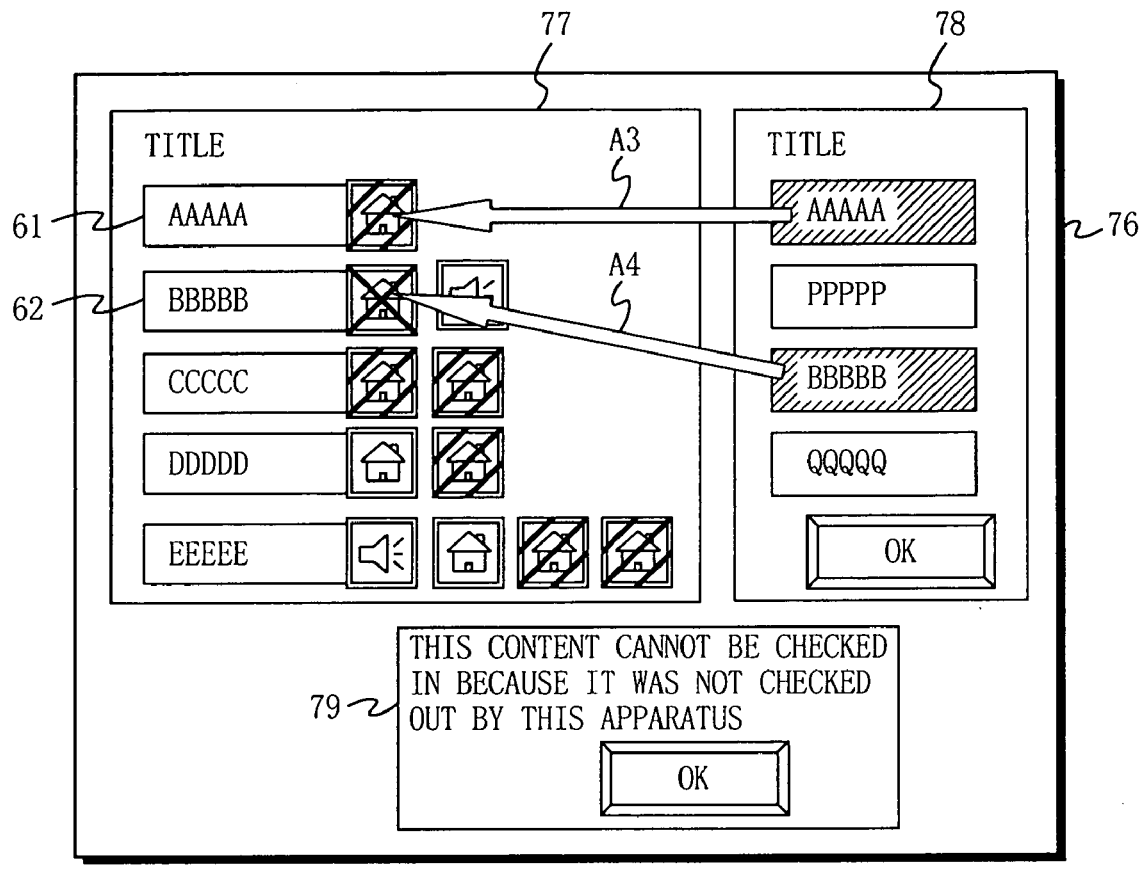
FIGS. 14a and 14b are diagrams exemplarily showing display screens during and after a check-in process that is carried out by the data processing apparatus according to the second embodiment.
Figure 14B:
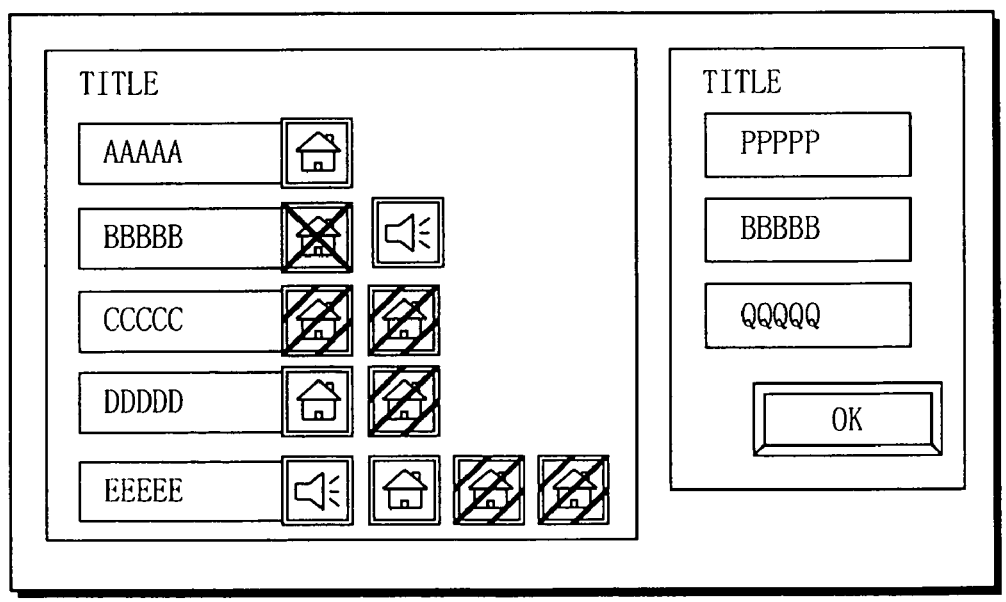
Figure 17:
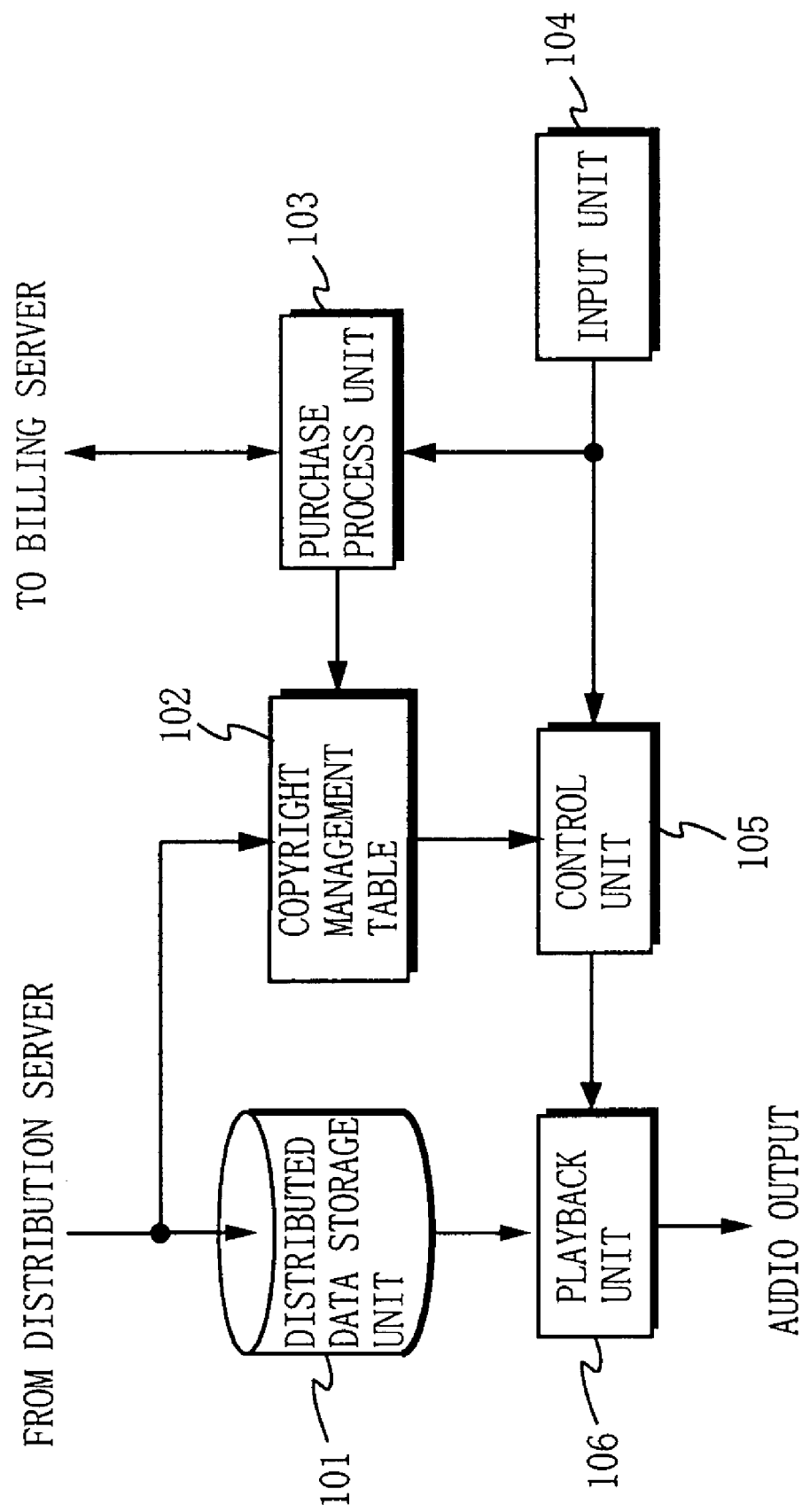
FIG. 17 is a block diagram showing the structure of a conventional data processing apparatus.
Figure 18:
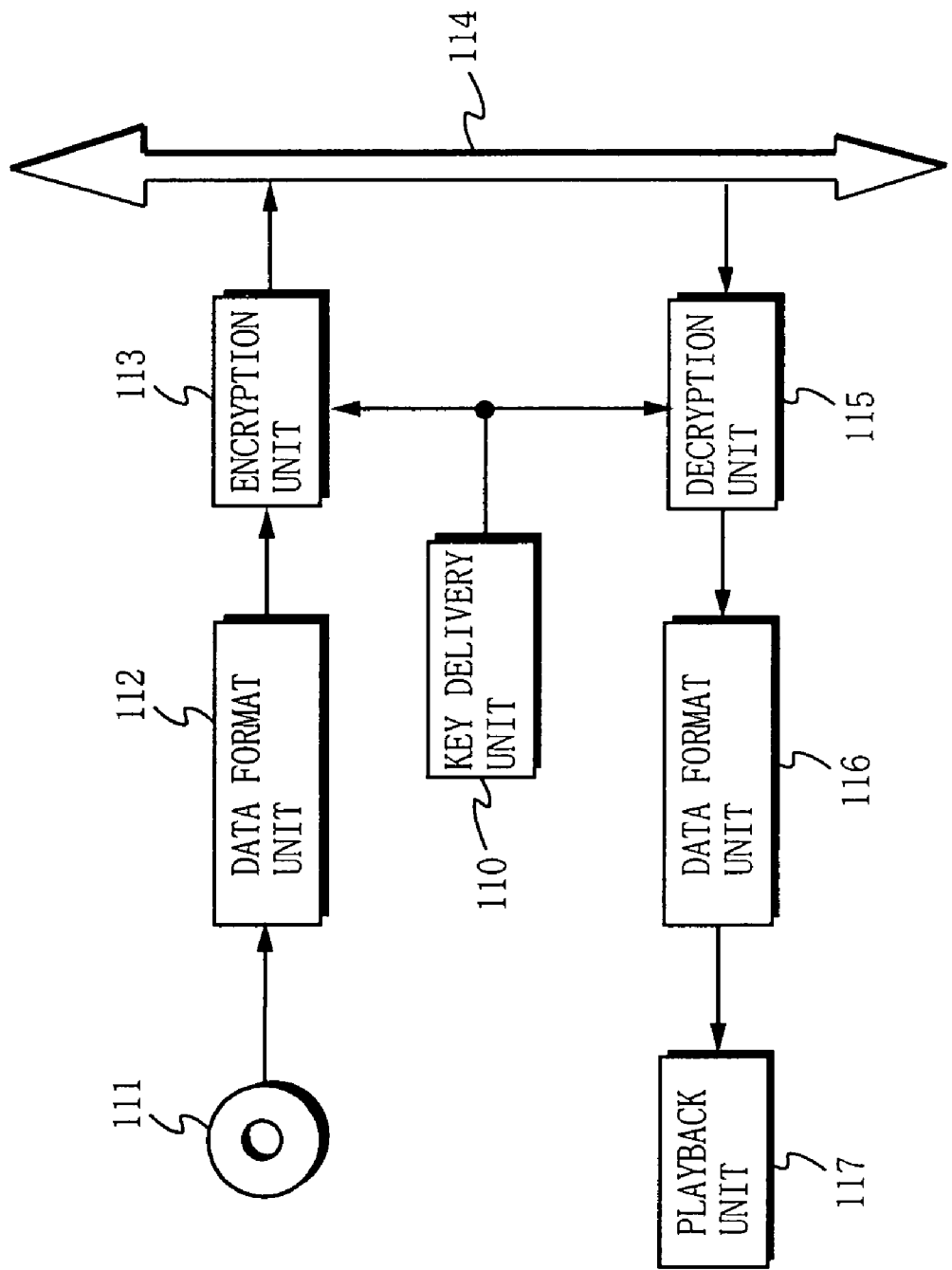
FIG. 18 is a block diagram showing the structure of a conventional copyright protection apparatus.

The data processing apparatus 2 displays screens that are shown in FIGS. 13a and 13b for check-out, while displaying screens that are shown in FIGS. 14a and 14b for check-in. FIGS. 13a and 13b are diagrams showing display screens during and after a check-out process, respectively. FIGS. 14a and 14b are diagrams showing display screens during and after a check-in process, respectively. Note that arrows A1 to A4 in FIGS. 13a–13b and 14a–14b are for the purpose of explanation only, and are not displayed on the screen.

As shown in FIG. 13a, a sub-screen 73 indicating contents in the data processing apparatus 2 and a sub-screen 74 indicating contents in the external storage medium 7 are displayed on a display screen 72 during the check-out process. The user selects an icon which is indicative of a check-out right that is displayed on the sub-screen 73 by using the pointing device, and then moves the icon into the sub-screen 74, as indicated by the arrow A1 or A2. The input unit 22 interprets this drag-and-drop operation as a check-out instruction.

In the example shown in FIG. 13a, one check-out right to a content 61 exists in the data processing apparatus 2. Therefore, the content 61 is checked out. However, no check-out right to a content 62 exists in the data processing apparatus 2. Therefore, a warning screen 75 is displayed, indicating that an unallowable check-out instruction has been made. On the warning screen 75, a message prompting for the purchase of a check-out right is displayed. Through the warning screen 75, the user can immediately purchase a check-out right to the content 62.

If the check-out right to the content 62 is purchased, the content 62 is checked out. After the check-out process, a screen as shown in FIG. 13b is displayed. Through this display screen, the user can recognize that the contents 61 and 62 have been checked out.

On the other hand, as shown in FIG. 14a, a sub-screen 77 indicating contents in the data processing apparatus 2 and a sub-screen 78 indicating contents in the external storage medium 7 are displayed on a display screen 76 during the check-in process. The user selects a content that is displayed in the sub-screen 78 with the pointing device, and moves the selected content into the sub-screen 77, as indicated by the arrow A3 or A4. The input unit 22 interprets that this drag-and-drop operation as a check-in instruction.

In the example of FIG. 14a, one check-out right in use for a content 61 exists in the data processing apparatus 2. In other words, the content 61 has been checked out to the external storage medium 7 from the data processing apparatus 2. Therefore, the content 61 is checked in, and the check-out right to the content 61 is recovered.

However, no check-out right in use for the content 62 exists in the data processing apparatus 2. In other words, the content 62 has not been checked out to the external storage medium 7 by the data processing apparatus 2. Therefore, a warning screen 79 is displayed, indicating that an unallowable check-in instruction has been made. After the check-in process, a screen as shown in FIG. 14b is displayed. Through this display screen, the user can recognize that the content 61 has been checked in, while the content 62 has not been checked in.

Furthermore, in the example shown in FIGS. 14a and 14b, if a check-in instruction is made for a content titled "PPPPP" that does not exist in the data processing apparatus 2, the warning screen 79 is also displayed.

For displaying the above-described screens, the input unit 22, the control unit 17, and the display unit 23 operate as follows. The input unit 22 receives display position information 35 from the display 23. The display position information 35 indicates the display positions of the sub-screens and the icons that are indicative of the process rights. By referring to the display position information 35, the input unit 22 outputs the instruction 30 when determining that an input of position information on the screen or a movement of the position can be taken as an instruction.

Figure 6:
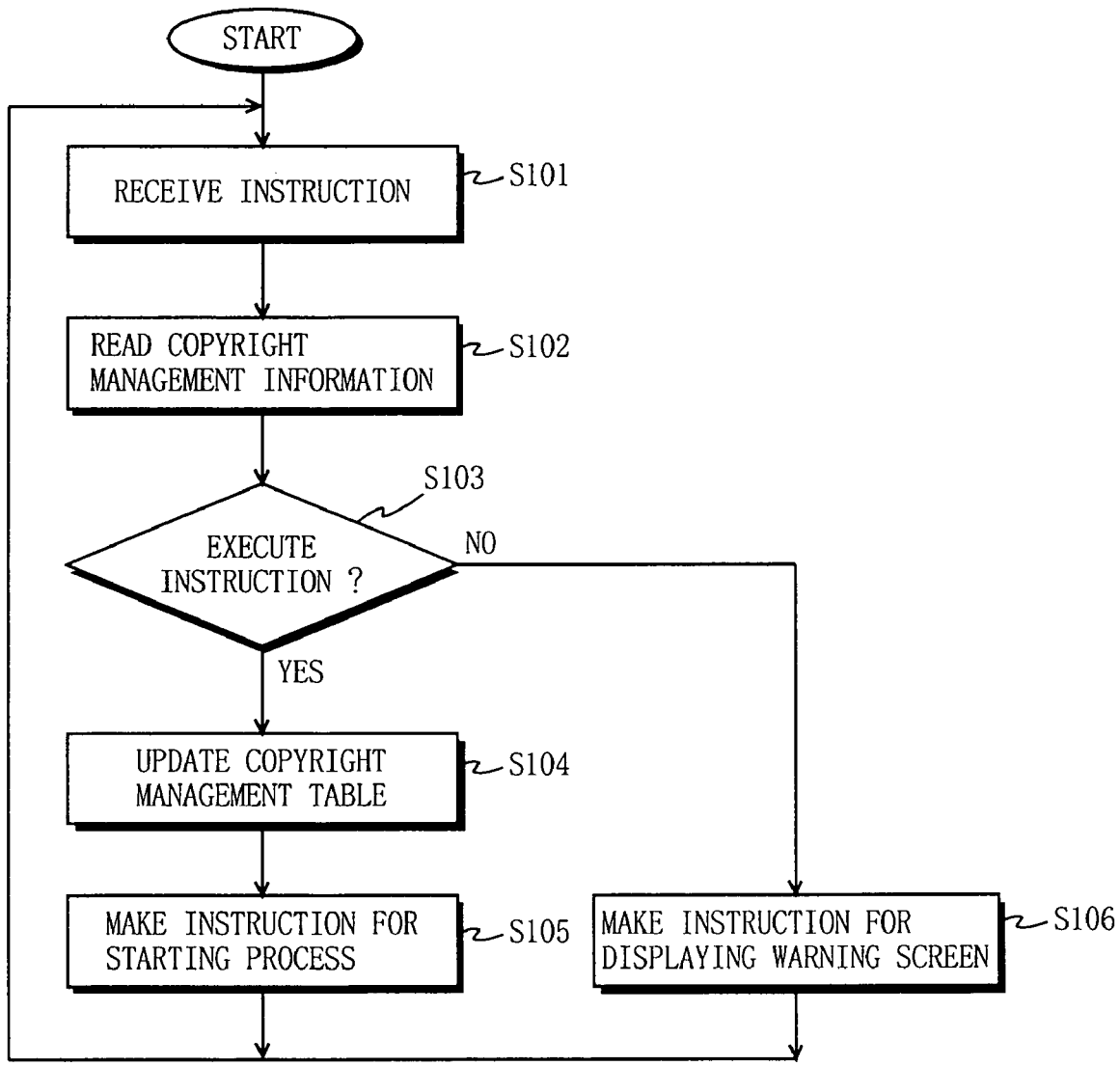
FIG. 6 is a flowchart showing the operation of a control unit in the data processing apparatus.

The control unit 17 operates according to the flowchart shown in FIG. 6. If determining that the check-out/check-in instruction is not to be executed, the control unit 17 produces the control signal 32 so as to instruct the display unit 23 to display the warning screen (step S106). When the display unit 23 receives the control signal 32, the display unit 23 adds the warning screen 75 or 79 to the screen for display.

As stated above, in the data processing apparatus 2 according to the second embodiment, the warning screen is displayed when a check-out/check-in instruction that cannot be processed is made. Therefore, the user can easily recognize that the check-out/check-in instruction has not been executed. Furthermore, when the check-out instruction cannot be made, the warning screen is displayed by including a message for prompting the user to purchase the check-out right. Therefore, the user can immediately purchase the check-out right through the warning screen.

Third Embodiment

FIG. 15 is a block diagram showing the structure of a data processing apparatus according to a third embodiment of the present invention. The data processing apparatus 3 shown in FIG. 15 includes the input unit 10, the distributed data storage unit 11, the purchase management table 12, the purchase process unit 13, the data conversion unit 14, the internal data storage unit 15, the copyright management table 16, the control unit 17, the playback unit 18, the check-out/check-in unit 19, a reference data editing unit 24, and a reference data storage unit 25. The data processing apparatus 3 of the third embodiment is used in the same music distribution system as the music distribution system for the data processing apparatus 1 according to the first embodiment, and is characterized in that new data for referring to distributed music data is used therein. The components in the third embodiment which are identical to those in the first embodiment are provided with the same reference numerals, and their description is omitted herein.

The data processing apparatus 3 uses new data called reference data for referring to the distributed music data. The reference data is used to define the music data that includes the original music data and new contents. An identifier of a package including the original music data (hereinafter referred to as reference package) is used for referring to the original music data from the reference data.

FIG. 16a is the same drawing as FIG. 3a, showing the distribution format of the music data. FIG. 16b is a diagram showing a format of the reference data. The reference data includes, as shown in FIG. 16b, a header 80, a reference package identifier 81, a plurality of pieces of reference information 82, and a plurality of contents 83. The header 80 includes information about the structure of the reference data such as the position and size of other data. The reference package identifier 81 is an identifier for the reference package. The content 83 is content data to be substituted or added to the reference package.

The reference information 82 indicates details on substitution or addition of a content. The reference information 82 indicating a substitution of the content is composed of a substitution flag 84, a content identifier before substitution 85, and a content identifier after substitution 86. This reference information 82 indicates that the content 83 that is included in the reference data with the content identifier after substitution 86 is substituted by the content 42 that is included in the reference package with the content identifier before substitution 85. Further, the reference information 82 indicating an addition of the content is composed of an additional flag 87 and an additional content identifier 88. This reference information indicates that the content that is included in the reference data with the addition content identifier 88 is added to the reference package.

The reference data editing unit 24 edits the reference data by following a reference data editing instruction 36 that is supplied by the input unit 10. The reference data storage unit 25 stores the reference data that is edited by the reference data editing unit 24.

When the playback unit 18 receives an instruction for playing back the reference data from the control unit 17, the playback unit 18 newly generates navigation information, and plays back the music data with this generated navigation information. In other words, the playback unit 18 extracts the reference package identifier 81 from the specified reference data. The playback unit 18 then reads the navigation information 41 that is included in the package having the reference package identifier 81, and expands the navigation information 41 on the memory therein. The playback unit 18 then edits the navigation information that is expanded on the memory by using the reference information 82 that is included in the reference data. For example, if the reference information 82 indicates a substitution of the content, the playback unit 18 substitutes the content identifier after substitution 86 for the content identifier before substitution 85 that is included in the navigation information on the memory. With this substitution, new navigation information is generated.

The playback unit 18 carries out playback based on the generated navigation information. Since the generated navigation information includes the content identifier after substitution 86 instead of the content identifier before substitution 85, the content 83 that is included in the reference data is played back instead of the content 42 that is included in the reference package. Therefore, music data with the user's data substituted or added thereto can be defined, and the defined data can be processed for playback and other purposes.

As mentioned above, in the data processing apparatus according to the third embodiment, the reference data for referring to the original music data is generated, and the music data is played back with the generated reference data. Therefore, without changing the navigation information that is included in the distributed original music data, the user's content can be freely substituted or added to the original music data. Furthermore, the reference data is composed only of the reference information and the user's content, and does not include the copyright management information. Therefore, the reference information can be separately distributed to other users for use.

Note that the data processing apparatuses according to the first to third embodiments can be achieved by combining a computer and a program which is operable on the computer. The data processing apparatus of the present invention can be realized by recording the program on a recording medium which is typified by a floppy disk and installing the program in an arbitrary computer system.

While the present invention has been described in detail, the foregoing description is in all aspects illustrative and not restrictive. It is to be understood that numerous other modifications and variations can be devised without departing from the scope of the present invention.

What is claimed is:

1. A data processing method for executing a process on copyrighted data within an obtained right, said method comprising:

storing the data;

storing a process right that is required for executing the process on the data stored in said storing of the data;

inputting an instruction for the data stored in said storing of the data;

determining, based on the process right stored in said storing of the process right, whether the instruction is to be executed or not;

executing the instruction; and displaying the process right stored in said storing of the process right on a screen, wherein the process right stored in said storing of the process right specifies a number of executions, wherein said displaying of the process right displays on the screen as many icons as the number of executions specified by the process right, wherein the process right comprises a check-out right representing a right to copy the stored data to a removable storage medium, and wherein said displaying of the process right displays at least one of "check-out is possible", "during check-out", and "check-out is impossible" with respect to the check-out right.

2. A recording medium having a program recorded thereon, said program for executing, on a computer, a data processing method of processing copyrighted data within an obtained right, said method comprising:

storing the data;

storing a process right that is required for executing the process on the data stored in said storing of the data;

inputting an instruction for the data stored in said storing of the data;

determining, based on the process right stored in said storing of the process right, whether the instruction is to be executed or not;

executing the instruction; and displaying the process right stored in said storing of the process right on a screen, wherein the process right stored in said storing of the process right specifies a number of executions, wherein said displaying of the process right displays on the screen as many icons as the number of executions specified by the process right, wherein the process right comprises a check-out right representing a right to copy the stored data to a removable storage medium, and wherein said displaying of the process right displays at least one of "check-out is possible", "during check-out", and "check-out is impossible" with respect to the check-out right.

3. A data processing apparatus for executing a process on copyrighted data within an obtained right, said apparatus comprising:

data storage means for storing the data;

right information storage means for storing a process right that is required for executing the process on the data stored in said data storage means;

input means for inputting an instruction for the data stored in said data storage means;

control means for determining, based on the process right stored in said right information storage means, whether said instruction is to be executed or not;

process execution means for executing the instruction: and display means for displaying the process right stored in said right information storage means on a screen, wherein the process right stored in said right information storage means specifies a number of executions, wherein said display means is operable to display on the screen as many icons as the number of executions specified by process right, wherein the process right comprises a check-out right representing a right to copy the data stored in said data storage means to a removable storage medium, and wherein said display means is operable to display at least one of "check-out is possible", "during check-out", and "check-out is impossible" with respect to the check-out right.

* * * * *